United States Patent
Laurent et al.

(10) Patent No.: US 7,255,951 B2
(45) Date of Patent: Aug. 14, 2007

(54) OPTIMIZED THERMAL MANAGEMENT FUEL CELL

(75) Inventors: Jean-Yves Laurent, Claix (FR); Didier Marsacq, Grenoble (FR); Francis Ternay, Meylan (FR); Francois DeCrecy, Seyssins (FR)

(73) Assignee: Commissariat a l'Energie Atomique, Paris (FR)

( * ) Notice: Subject to any disclaimer, the term of this patent is extended or adjusted under 35 U.S.C. 154(b) by 630 days.

(21) Appl. No.: 10/483,440

(22) PCT Filed: Jul. 10, 2002

(86) PCT No.: PCT/FR02/02420

§ 371 (c)(1),
(2), (4) Date: Jan. 9, 2004

(87) PCT Pub. No.: WO03/007409

PCT Pub. Date: Jan. 23, 2003

(65) Prior Publication Data

US 2004/0170879 A1   Sep. 2, 2004

(30) Foreign Application Priority Data

Jul. 12, 2001  (FR) .................... 01 09301

(51) Int. Cl.
*H01M 8/04*  (2006.01)

(52) U.S. Cl. .......................... 429/26; 429/34

(58) Field of Classification Search ............. None
See application file for complete search history.

(56) References Cited

U.S. PATENT DOCUMENTS

| 4,578,324 A | 3/1986 | Koehler et al. |
| 6,087,028 A | 7/2000 | Goto |

FOREIGN PATENT DOCUMENTS

| EP | 0 814 528 A2 | 12/1997 |
| JP | 60-41769 | 3/1985 |
| JP | 60-241668 | 11/1985 |
| JP | 61-58173 | 3/1986 |
| JP | 62-274562 | 11/1987 |
| JP | 2000-226681 | 8/2000 |
| JP | 2000-353536 | 12/2000 |

OTHER PUBLICATIONS

Machine translation of JP 2000-226681, Aug. 15, 2000.*
Machine translation of JP 06-231794, Aug. 19, 1994.*
Patent Abstracts of Japan, Konuki Toshiaki, "Liquid Fuel Cell", Publication No. 61055870, Publication Date: Mar. 20, 1986, 1 page.
Patent Abstracts of Japan, Ouchi Takashi, "Air Cooling Type Fuel Cell", Publication No. 61260551, Publication Date: Nov. 18, 1986, 1 page.

* cited by examiner

*Primary Examiner*—Jonathan Crepeau
(74) *Attorney, Agent, or Firm*—Pearne & Gordon LLP

(57) ABSTRACT

A fuel cell comprises a thermal dissipation structure whose connecting element (8) is a shape memory alloy highly conductive at high temperatures, but much less so at low temperatures, which allows the cell to heat up quicker and reach its performance level.

4 Claims, 2 Drawing Sheets

Figure 3:
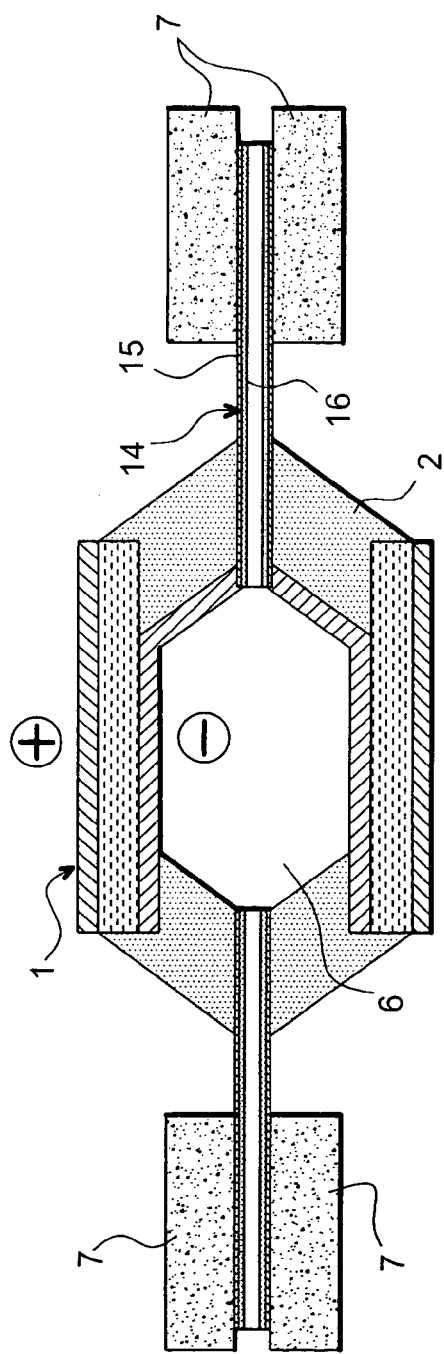
Figure 4:
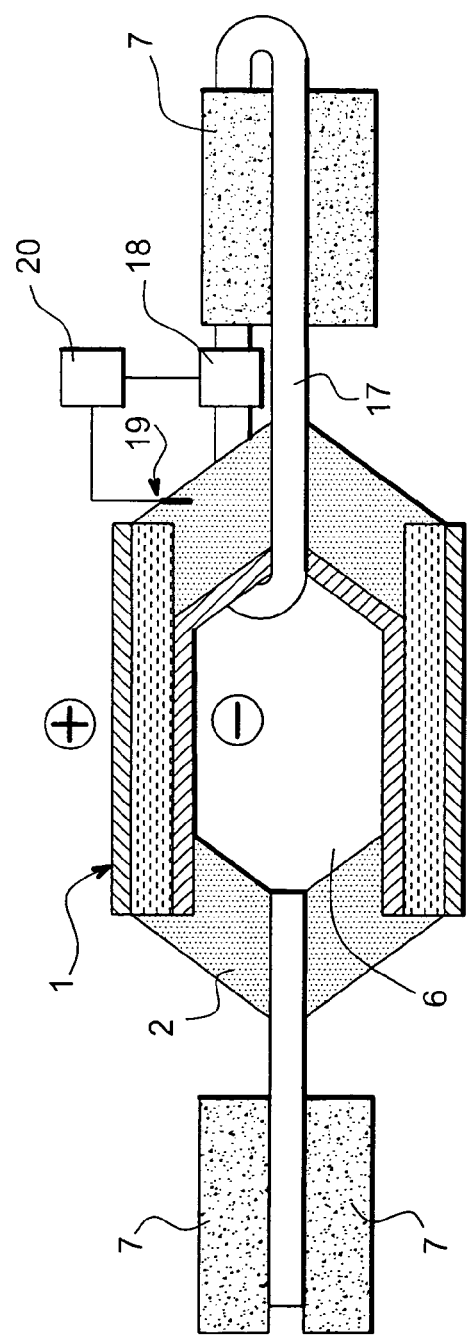

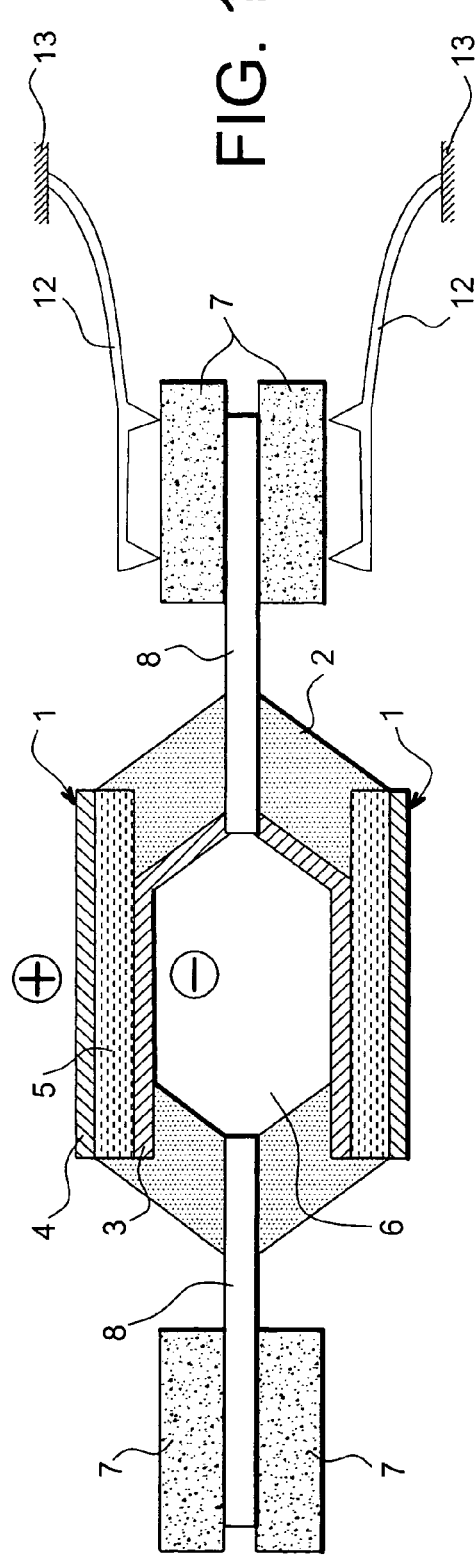
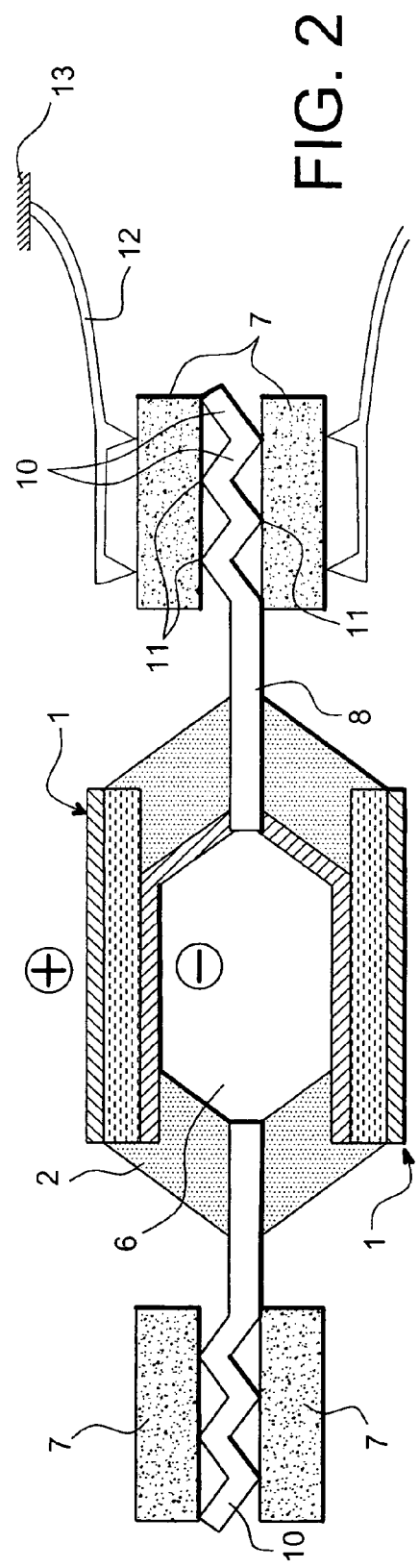

OPTIMIZED THERMAL MANAGEMENT FUEL CELL

Under consideration is a fuel cell.

Fuel cells are the centre of a chemical reaction producing electrical energy between a fuel and an oxidising agent. The reaction takes place in assemblies normally comprising a pair of electrodes and an intermediary solid electrolyte, and it is accompanied with a release of intense heat which ought to be regulated. For this reason cells normally comprise thermal dissipaters connected to the assemblies via thermal connectors. Overheating of the assemblies is thus prevented. It however appears that the performance of cells is poor when cold and that the temperature stabilisation period is long.

Current mid-power cells (a few kilowatts) sometimes have an autonomous and adjustable cooling system, which is however hardly conceivable for low power cells (a few watts) which are of greater concern today and for which this problem of poor performance at low temperatures is more acute as their operating is often more discrete. The patent U.S. Pat. No. 5,759,712, which discloses fuel cells at length, covers the ensuring of heat evacuation via permeable membranes, without making mention of it as being a progress.

The object of this invention is therefore an improved fuel cell which has the peculiarity that the thermal connectors are shape memory alloys bearing two main states: a hot state where they correctly ensure the role of thermal connection between the assemblies and the dissipaters; and a cold state where this thermal connection is reduced or broken. One such conductive commutation between two states ensures quick heating up of the cell to its operating temperature, then normal dissipation, without the operator having to intervene.

Several particular embodiments, proposed to materialise this conception, will be disclosed with the help of FIGS. 1 and 2.

The cell in FIG. 1, whose principal parts only are represented, comprises assemblies 1 arranged on a support 2 and each comprising an anode 3, a cathode 4 and a solid electrolyte membrane 5 between the anode 3 and the cathode 4. The support 2 (in silicon, plastic, ceramic . . . ) is a duct of polygonal section which encloses a fuel channel 6. According to the applications, this channel can be of different shapes, for example a chamber. Indeed, there are two assemblies 1 each located on opposite sides of a section of the support 2. Other similar pairs of assemblies 1 can be arranged elsewhere on the support 2. The fuel in the channel 6 ionises on the assemblies 1 and reacts with the ions coming from an oxidising agent environment. This combination chemical reaction produces an electric current in a non-represented circuit linking the anode 3 to the cathode 4, and the heat produced by this reaction flows into the support 2. The heat to be dissipated terminates at heat radiators 7 that have large exchange surfaces with the environment and connected to the support 2 via connecting strips 8. In the represented embodiment, there are two connecting strips 8 and they are embedded at one end into the support 2 between the two assemblies 1, and their opposite ends are attached between a pair of radiators 7. The connecting strips 8 point in the opposite direction from the support 2, which is therefore located between the pair of radiators 7.

The connecting strips 8 acting as thermal connectors are made in a shape memory alloy for this invention. These alloys, for which several compositions are now well known to those skilled in the art, have the property of changing crystalline structure above a transition temperature, and naturally changing from a martensitic structure to an austenitic structure when they are heated. The transition temperature depends on the composition of the alloy and in practice can virtually be freely selected. The thermal conductivity of these alloys is often much greater, double for example, in the austenitic state than in the martensitic state. Their best-known property is however that they can distort when changing state: they were plastically distorted at the austenitic state, they recover their initial shape when returning to the martensitic state but return to the shape resulting from the distortion when returning to the austenitic state. The change in shape is reversible for a large number of temperature transitions.

These properties can be used as follows for the needs of the invention. The connecting strip 8 is flat in the hot state which FIG. 1 represents and is compressed between the pairs of radiators 7 which lean against large surfaces of it. The cold state of the connecting strip 8 is represented in FIG. 2: here the flat shape is replaced with ripples 10 between the pairs of radiators 7, so that the connection with them is not solely ensured by the edges 11 of the latter; it is therefore reduced, which is appreciated as it is then in a cold state of the cell and that the heat produces at the beginning of its operating remains for a longer period in the support 2 and contributes to heating the assemblies 1 so that they can reach their operating temperature quicker, where their efficiency is at its highest. When this hot state of the cell is reached, the transition temperature of the connecting strips 8 has been exceeded and they have returned to their flat shape which allows them to transmit, with a greater flow, the heat to the radiators 7 and to the outside, which thus stabilises the temperature of the cell. Springs 12, embedded into fixed points 13 of the cell bear on the radiators 7 and hold them against the connecting strip 8 even when the latter returns to its flat shape.

It can be noted that it is not necessary to resort to shape changing proposed by these alloys as their thermal conductivity also varies in the transition of the two crystalline structures: as this conductivity is greater in the hot state, the stabilising of the temperature can already be exercised without resorting to a variation in the surface contact with the radiators 7. The device can thus immutably take on the aspect of FIG. 1, although it then becomes possible to eliminate the springs 12 and to stick the thermal dissipaters onto the connecting strips 8.

The distortion to ripples 10 or to a similar shape is appreciable as it is not accompanied with large movements. It also allows a radiator 7 to be fitted to each side of the connecting strip 8 and to principally break the physical and thermal connection with each of them. This duality of radiators 7, joined with the best conductivity of the alloy above the transition temperature, ensures a large capacity to evacuate the heat in the hot state of the cell.

In all these embodiments, the radiator 7 is not indispensable and could be replaced with any type of dissipater. The free end of the heat transfer device could even, in certain situations, remain free and give off the heat directly captured into the cold source which surrounds it.

Then invention claimed is:

1. Fuel cell comprising at least an oxidising agent assembly (1) of fuel and a thermal connector connecting the assembly to a cold source, wherein the thermal connector comprises a connecting strip (8) in shape memory alloy which comprises a hot state where it has a high thermal conductivity and a cold state where it has a low thermal conductivity, the connecting strip being embedded at one end into a support (2) of the assembly (1), the connecting strip being fitted on a radiator (7) placed in the cold source at an opposite end, and the connecting strip being flat in the hot state and rippled in the cold state at said opposite end so that the connecting strip is in contact via a surface with the radiator in the hot state and in contact via at least one edge with the radiator in the cold state.

2. Fuel cell according to claim 1, characterised in that a spring (12) pushes the radiator towards the connecting strip.

3. Fuel cell according to claim 1, characterised in that the thermal connector has a pair of radiators (7) on both sides of the connecting strip (8).

4. Fuel cell according to claim 1, further comprising two assemblies (1) located on opposite sides of a fuel channel (6) and two thermal connectors embedded into the channel between the said opposite sides.

* * * * *